United States Patent [19]

Marcantonio et al.

[11] 4,140,834

[45] Feb. 20, 1979

[54] FORMING A LUBRICATING AND RELEASE COATING ON METAL MOLD AND TREATED METAL SURFACE

[75] Inventors: Arnold F. Marcantonio; Paul J. Kress; Gene A. Lee, all of Muncie, Ind.

[73] Assignee: Ball Corporation, Muncie, Ind.

[21] Appl. No.: 712,582

[22] Filed: Aug. 6, 1976

Related U.S. Application Data

[62] Division of Ser. No. 537,507, Dec. 30, 1974, Pat. No. 3,994,847.

[51] Int. Cl.$^2$ ............................ B32B 27/06; B05D 3/00; B05D 3/12
[52] U.S. Cl. .................................... 428/419; 428/411; 428/408; 428/461; 428/421; 428/407; 428/403; 428/520; 428/469; 427/327; 427/330; 260/29.2 R; 260/37 R; 65/26; 65/169; 252/22; 252/29
[58] Field of Search ................. 260/29.2 R, 237 R; 428/411, 419, 461, 421, 407, 403, 432, 442, 441; 427/327, 330; 252/22, 29

[56] References Cited

U.S. PATENT DOCUMENTS

| | | | |
|---|---|---|---|
| 3,810,769 | 5/1974 | Blacker et al. | 260/29.2 R X |
| 3,874,862 | 4/1975 | Bickling, Jr. et al. | 260/29.2 R X |
| 3,878,113 | 4/1975 | Campbell et al. | 260/29.2 R X |
| 4,003,867 | 1/1977 | Cooper et al. | 260/29.2 R X |

*Primary Examiner*—P. C. Ives
*Attorney, Agent, or Firm*—Gilbert E. Alberding

[57] ABSTRACT

Release and lubricating compositions are disclosed for avoiding seizure between molten glass and metal molds for forming glass articles and for improving the quality of glassware produced therefrom, comprising an aqueous dispersion containing polyphenylene sulfide, an inorganic binder, and a solid lubricant. The inorganic binder may be represented by the general formula $MPO_4$ wherein M is a metal ion selected from the group consisting of aluminum, chromium, magnesium, iron and zinc. The particular solid lubricants include members selected from the group consisting of graphite, molybdenum disulfide, polyterafluorethylene, and mixtures thereof.

4 Claims, No Drawings

FORMING A LUBRICATING AND RELEASE COATING ON METAL MOLD AND TREATED METAL SURFACE

This is a division of application Ser. No. 537,507 filed Dec. 30, 1974, now U.S. Pat. No. 3,994,847.

BACKGROUND OF THE INVENTION

The present invention relates generally to glass forming and more particularly to preventing seizure and sticking of molten glass to metal forming molds, for instance, glassware-forming molds, and lubricating of such forming molds under extreme temperatures. It is well known to form glass by shaping highly viscous molten glass in metal forms or molds until the glass cools sufficiently to maintain the induced form. One particularly demanding process for forming glass is the formation of glassware such as bottles. In this process, a glob of molten glass is typically first formed by a blank mold into a parison having a finished portion corresponding to the neck portion of the desired glassware. A neck ring engaging the finish portion of the parison is utilized to transport and place the parison in a blow mold, wherein blowing and cooling air or wind is conducted to the interior of the parison to force it into conformity with the blow mold and thereby to form the glassware.

Since molten glass will adhere to hot metal and since the various mold sections will quickly wear if not lubricated, it is necessary to apply a release lubricating agent to the molds. However, the glassware-forming process is exceedingly demanding upon release agents and lubricating compositions in that much of the heat from the molten glass is carried off through the metal molds in order to lower the surface temperature and raise viscosity of the formed glassware so the glassware will be self-supporting. Thus, since the molten glass is initially at a temperature of about 1800° F. to about 2200° F., and since the metal mold is usually hot below about 950° F. to 975° F., it will be appreciated that the lubricant interposed between the molten glass and the metal molds will be subjected to most extreme and intensified heat stresses. However, molten glass will stick to metal if the release agent is vaporized and the mold parts will wear rapidly if the lubricating agent is not maintained.

Heretofore, a "dope", typically a dispersion of graphite in a light petroleum product such as kerosene, has been applied periodically by hand-held swab sticks to prevent sticking of glass to metal molds and to provide lubrication of the interacting mold sections. The drawbacks of this composition and application approach include the short period for which such dope is effective, the flashing of objectionable hydrocarbon vapors, and the loss of glassware. Since the glass molds are at an elevated temperature, the petroleum product is flashed off quickly from the mold and constitutes an obnoxious environment and fire hazard. Attempts to collect the vapor with hoods of special design in other apparatus have often resulted in unfavorable conditions. Often fires from the vaporization of oils and hydrocarbons in the vicinity of the glass-forming machine results. Frequent venting of the petroleum products to the atmosphere is, of course, not desirable.

Production of glassware is also adversely affected by the use of the petroleum oils-graphites swabbing composition. When the petroleum product flashes off, it lowers the temperature of the mold thereby increasing the possibility of "check" defects in the glassware formed immediately after swabbing. Further, the first several articles formed after swabbing commonly have graphite particles embedded therein and must be rejected by inspectors as defective glassware. This results in a loss of pack or efficiency on the order of 3% or more of the glassware. This, of course, is an unfavorable condition.

Use of water-based carriers in place of the petroleum carriers for graphite have not heretofore been entirely satisfactory. Objectionable odor problems and smoke, or fumes have marked the use of certain other proposed lubricants.

Further discussion of the long-existing problems with swabbing of molds and the effects to avoid or live with these problems are found in U.S. Letters Pat. Nos. 3,141,752; 3,480,422; 3,508,893; 3,523,016 and 3,623,856.

As might be expected, the above enumerated drawbacks and inefficiencies attendant to the dispersion of graphite in a petroleum base has led to numerous efforts to replace this composition with the more advantageous swabbing or parting agent. Except for narrow or marginal success under the less extreme of normal operation conditions, no suitable compounds have heretofore been known.

Elevated mold temperatures during glassware production make it difficult to successfully wet the mold surface when applying a lubricating composition. This is particularly true of formulations containing water. This problem is severely compounded when a constituent which will coat the mold, quickly cures and secures the graphite is included in the swabbing composition.

Examples of otherwise excellent lubricants and parting agents which have been tested in the demanding environment of glassware production and found to be inadequate include water-soluble graphite paste. High pressure impingement with molybdenum disulfide with binder and various aqueous and/or alcohol base swabs. Some limited previous success has been obtained with coatings for six to eight hour runs on conventional glass-forming machines, but these have proven to be extremely difficult to apply and have not provided reproducible results. Except for attempts to substitute another carrier for the petroleum product, few previous attempts have coped with the problem of swabbing during production.

While at first encounter, it would appear that the existence of a knowledge of many different lubricants would determine a satisfactory release and lubricating system for glass molds could easily be formulated, this has not been the case. However, as discussed in U.S. Letters Pat. No. 3,495,962 the extreme conditions and varying, somewhat incompatible, requirements of glassware-forming molds have presented formidable barriers to the technology. At the present, the above-discussed petroleum and graphite swabbing dopes are almost universally employed.

SUMMARY OF THE INVENTION

The present invention, which provides a heretofore unavailable improvement over the previously used release and lubricating compositions especially adapted for providing a markedly flexible coating and avoiding seizure between molten glass and metal molds, comprises an aqueous dispersion containing polyphenylene sulfide, an inorganic binder, and a solid lubricant. The present invention also relates to a method of applying the compositions, and the surfaces treated with said compositions.

Instead of periodic applications of the release and lubricating composition as required by the prior art the compositions of the subject invention are found to be effective for relatively extended periods of time. The compositions herein described may be reapplied at the end of these periods of long use by swabbing the subject compositions during production as required of glassware.

It has been found that the subject compositions minimize a loss of pack which often results from the inclusion of graphite in the glassware surface and the altering of operational temperatures. Also, contamination of the surrounding machinery and the atmosphere with oily fumes and vapors are greatly reduced or completely avoided.

Accordingly, an object of the subject invention is to provide an improved parting and lubrication system for glassware molds.

Another object of the present invention is to provide a parting lubricating system which greatly extends the efficiency of glass-forming machines minimizing periodic swabbing or treatment thereof.

Yet another object of the present invention is to provide an improved parting and lubricating system which can be renewed periodically without materially effecting the production of glassware.

Further, another object of the present invention is to provide a parting and lubrication system which can be swabbed optionally either prior to the production process or during the actual production.

Yet still another object of the present invention is to provide a lubrication system for glassware molds which lubricates the more stressed portions of the glassware molds, such as the neck rings or blank molds, for an extended period of time.

Still another object of the present invention is to provide a glassware parting and lubrication system which obviates contamination of glass-forming machines and the atmosphere with oily fumes from the swabbing compound.

These and other objects and features of the present invention will become apparent from the following description.

DETAILED DESCRIPTION OF THE INVENTION

According to the present invention, glassware-forming molds are treated with a release and lubricating composition comprising an aqueous dispersion containing polyphenylene sulfide, an inorganic binder, and a solid lubricant. Also, this invention relates to a method of forming a lubricating and release coating on the surface which comes in contact with hot glass bodies in the manufacture of glass articles, comprising applying an aqueous dispersion containing polyphenylene sulfide, an inorganic binder, and a solid lubricant to said surface to be coated and removing the water from said dispersion to affix the coating thereon.

As used herein, "dispersion" is used generically to include suspensions, solutions, and mixtures.

The solid lubricant may be any of a large family of inorganic compounds which have high temperature resistance characteristics. Illustrative of such solid lubricants are graphite, tungsten disulfide, and molybdenum disulfide. A preferred solid lubricant is graphite. The graphite may be any of the various particulate forms, such as flake, electrolytic and colloidal graphite or conventional graphite known to the trade. Further, it is understood that either natural or synthetic forms of graphite can be satisfactorily employed in accordance with the subject invention. While particle size of the graphite is not critical, particles ranging from 10 to 200 microns are useful, and preferably particle sizes less than 75 microns should be employed. It is understood that combinations of graphite and molybdenum disulfide may be advantageously employed herein. The molybdenum disulfide may also be employed, especially in a finely divided state, and generally, a particle size smaller than 0.2 microns is very suitable for the compositions herein described. The amount of solid lubricant useful in the compositions herein may range from about 10 to about 40 weight percent based on the solid content of the composition.

The inorganic binder useful herein may be represented by the general formula $MPO_4$ wherein M is a metal ion selected from the group consisting of aluminum, chromium, magnesium, iron, and zinc. A preferred inorganic binder is aluminum phosphate. Other useful inorganic binders include magnesium phosphate and zinc phosphate. Generally, about 30 to about 80 weight percent of the inorganic binder is required.

The polyphenylene sulfides function essentially as binders. Their preparation may be generally carried out by the reaction of at least one polyhalo-substituted aromatic compound with an alkali metal sulfide in a polar organic compound reaction medium. The preparation of the polyphenylene sulfide is discussed in U.S. Pat. No. 3,354,129. Generally, the polyphenylene sulfides are high melting, thermoplastic materials which have excellent high temperature stability. The polyphenylene sulfide produced from such preparations may be represented by the following general formula:

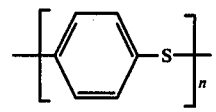

wherein "n" is a whole number. The molecular weight of such materials is at least 1000, but generally is in a range between 1,200 to 200,000 and more suitably a molecular weight of about 50,000. The polyphenylene sulfides undergo fusion and undergo cross-linking when temperatures are in excess of 550° F. It may be assumed that upon reaching this temperature range the polyphenylene sulfide cross-links into a very high molecular weight composition. A preferred polyphenylene sulfide is one having an inherent viscosity, [n] 206° C. equaling 0.16 as measured in chloronapthalene and a melting point of about 550° F., as determined by differential thermal analysis. Generally, about 5 to about 40 weight percent of polyphenylene sulfide is preferred.

In carrying out the process of this invention, it is generally desirable to clean the surface of the glass-forming equipment beforehand to remove all contamination such as metal oxide, loose particles, oil, dirt and the like to assure a better adhesion and longer life of the coatings.

In treating molds and mold parts including blank molds, rings and the like with the compositions herein described, the application and subsequent drying of these compositions may be carried out in a straight-forward manner. Simply, the treatment of such molds and mold parts consist in applying the aqueous dispersion described herein and allowing the water to be evaporated or removed therefrom by airing or heating. It is understood that the water in the aqueous dispersion may be removed by any number of conventional means. Subjecting the compositions herein to a temperature between about 500° and 700° F., generally for a period of 30 minutes to one hour serves to adequately remove the water and affix the composition to a given substrate. The dispersions of the subject invention may be applied to the surface by any of the normal or conventional means such as brushing, spraying, dipping, or blowing onto the surface. Spraying is preferred.

After removing the water from the mixture of the release and lubricating compositions and heating to affix the compositions to the substrate a coating is formed which adheres tenaciously to the surface in a thin, uniform coating. The coating thus formed exhibits, aside from thermal stability, marked impact resistance as well as significant elongation characteristics. The coating thickness may vary considerably depending upon, of course, the amount applied and may range between 0.5 to 5 mils. The coating itself is thermally stable, offers good oxidation resistance and allows for good heat transfer. Further, the compositions herein described are very effective in producing glass articles of excellent quality.

It is often found that conventional wetting agents may be used in conjunction with the foregoing compositions. Wetting agents may be readily employed to facilitate dispersion of the solid lubricants and to stabilize the resulting dispersion. A wide range of wetting agents are available and any of the normal wetting agents can be utilized in conjunction with the subject invention.

The results obtained through the use of the aforedescribed compositions demonstrate that the ordinary operational life on conventional machines is many times greater than the operational life of conventional coatings. Further, by the composition herein disclosed and claimed, there is produced great savings in time and cost since it is possible to operate glass-forming equipment for considerably longer periods of operational life to appreciably minimize the necessity of hand swabbing the molding equipment and other portions thereof that come in contact with hot glass bodies.

Although the present formulation and methods are addressed particularly to glass-forming machines and associated parts, it will be appreciated that such compositions and methods are also very useful for molds and the like when parting and lubricating are necessary. Thus, the herein described compositions may be useful in the rubber and plastic industries as well as the metal forming industries such as for zinc, aluminum, and alloys thereof.

The following examples are offered to illustrate but not to limit the subject invention in detail:

EXAMPLE I

A release and lubricating dispersion was prepared as follows:

Approximately 1 kg., of a 50% aluminum phosphate solution was thoroughly mixed in a ball mill with 0.22 kg., polyphenylene sulfide, about 0.22 kg., graphite, about 20 gms., a nonionic surfactant (Triton X-100 Rohm & Haas Company) and about 1 kg., water.

The above dispersion was applied to glass-forming molds by spraying. The molds were heated to about 700° F., for about 30 minutes. The resulting coating adhered well to the molds and produced excellent quality quart size jars for about 30 hours without additional swabbing by conventional petroleum and oil swabbing dope.

EXAMPLE II

The procedure for making the release and lubricating dispersion in Example 1 was repeated with the exception that zinc phosphate was used on an equal molar basis in place of the aluminum phosphate. The resulting dispersion was coated as in Example I and resulted in an excellent coating adhesion and rendered very satisfactory glass jars over a period of about 25 hours in an Individual-Section Glass-Forming Machine.

EXAMPLE III

A release and lubricating composition was prepared by mixing about 1 kg., of a 50% aluminum phosphate solution in a ball mill with 0.75 kg., polyphenylene sulfide, about 0.8 kg., polytetrafluoroethylene (Teflon, E. I. du Pont de Nemours & Co.,) about 20 gms., nonionic surfactant (Triton X-100), and 1 kg., water. This aqueous dispersion was applied and heated as in Example I to molding surfaces for making rubber products via compression molding. The composition offered excellent release and lubricating properties over a 50 hour period.

EXAMPLE IV

A release and lubricating composition was prepared containing about 1 kg., 50% solution of sodium silicate in which was thoroughly mixed 0.25 kg., polyphenylene sulfide, and about 0.20 kg., graphite in a ball mill. Six test panels were coated by spraying three of them with the aforedescribed dispersion which was air dried and heated to about 700° F., for about 30 minutes. The other three panels were treated with the composition described in Example I, air dried, and heated to about 700° F., for about 30 minutes.

The adhesion of the molten glass to these test panels was determined by melting the end of a glass rod in an open flame and pressing the molten glob formed on the end of the rod onto and against the coating panels. After a few seconds of contact with the panels, the molten glass was pulled away and a degree of adherence was noted. The molten glass exhibited severe sticking to the composition containing the sodium silicate whereas the composition of Example I rendered excellent release properties with no sticking or adhesion being observed.

EXAMPLE V

Four (4) release and lubricating compositions were prepared and designated A, B, C, and D, and weights thereof being in parts by weight, as indicated in the following table:

TABLE

| Designation | A | B | C | D |
|---|---|---|---|---|
| Aluminum Monophosphate | 100 | 77 | 69.5 | — |
| Polyphenylene Sulfide | — | 23 | 30.6 | 100 |
| Graphite | 50 | 23 | 30.6 | 50 |
| % Adhesion ASTM D2197-68 | 95 | 95 | 95 | 100 |
| % Elongation ASTM D1737-62 | 7 | 17 | 17 | 17 |
| Impact Resistance | | | | |
| Direct, in-lbs | 12 | >30 | >30 | >30 |
| Reverse, in-lbs | 2 | >30 | >30 | >30 |
| ASTM D2794-69 | | | | |
| Thermal Stability, Weight Retained | 86% | 72% | 69% | 44% |

TABLE-continued

| Designation | A | B | C | D |
|---|---|---|---|---|
| 60 min. at 1000° F. | | | | |

It is readily apparent from the foregoing table that the incorporation of organic binders along with the inorganic binders greatly enchance the percent elongation of the coating. This characteristic is manifested and is important in maintaining coatings on curvilinear surfaces where flaking and cracking is prevalent, expecially in Individual-Section Glass-Molding Equipment. Another important characteristic is the impact resistance. Although the impact resistance of composition D is improved, it is noted that the thermal stability thereof is greatly reduced. In short, the compositions B and C are preferred compositions under this invention.

While the subject invention is described in detail in several embodiments which this invention may assume in practice, it will be appreciated to those skilled in the art that there are changes and modifications that may be made without departing from this invention, the scope of which is defined in the following claims.

We claim:

1. A treated metal surface for forming hot glass articles consisting essentially of a metal surface having securely adhered thereto a coating consisting essentially of a water-free remainder of an aqueous dispersion consisting essentially of about 5 to 40 weight percent polyphenylene sulfide having a molecular weight in excess of 1000, about 30 to 80 weight percent inorganic binder having the formula $MPO_4$ wherein M is a metal ion selected from the group consisting of aluminum, chromium, magnesium, iron, zinc and mixtures thereof, and about 10 to 40 weight percent of a solid lubricant selected from the group consisting of graphite, molybdenum disulfide, polytetrafluoroethylene and mixtures thereof, the balance being essentially water, said coating being from about 0.5 to about 5 mils in thickness and having improved elongation, impact resistance and thermal stability characteristics.

2. The treated metal surface of claim 1 wherein said aqueous dispersion also includes a wetting agent.

3. A method of forming a lubricating and release coating on a metal mold surface which contacts hot glass material during the molding thereof, comprising applying to said metal mold surface an aqueous dispersion consisting essentially of about 5 to 40 weight percent polyphenylene sulfide having a molecular weight in excess of 1000, about 30 to 80 weight percent inorganic binder having the formula $MPO_4$ wherein M is a metal ion selected from the group consisting of aluminum, chromium, magnesium, iron, zinc and mixtures thereof, and about 10 to 40 weight percent of a solid lubricant selected from the group consisting of graphite, molybdenum disulfide, polytetrafluoroethylene, and mixtures thereof, the balance being essentially water, and heating said surface and said dispersion applied thereto to remove the water of said dispersion so as to form on said surface a thin coating having improved elongation, impact resistance and thermal stability characteristics.

4. The method of claim 3 wherein said aqueous dispersion also includes a wetting agent.

* * * * *